United States Patent
Barrus et al.

(10) Patent No.: US 9,553,893 B2
(45) Date of Patent: Jan. 24, 2017

(54) ENHANCED MESSAGE SECURITY

(75) Inventors: William G. Barrus, Apex, NC (US);
Cary L. Bates, Rochester, MN (US);
Robert J. Crenshaw, Apex, NC (US);
Paul R. Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 12/348,451

(22) Filed: Jan. 5, 2009

(65) Prior Publication Data
US 2009/0310785 A1    Dec. 17, 2009

Related U.S. Application Data

(62) Division of application No. 10/134,184, filed on Apr. 29, 2002, now Pat. No. 7,475,248.

(51) Int. Cl.
| H04L 29/06 | (2006.01) |
| H04L 12/58 | (2006.01) |
| H04W 12/02 | (2009.01) |
| H04W 4/12  | (2009.01) |

(52) U.S. Cl.
CPC ........... *H04L 63/18* (2013.01); *H04L 12/5895* (2013.01); *H04L 51/38* (2013.01); *H04L 63/0428* (2013.01); *H04L 63/0492* (2013.01); *H04W 12/02* (2013.01); *H04L 63/067* (2013.01); *H04L 63/0853* (2013.01); *H04W 4/12* (2013.01)

(58) Field of Classification Search
CPC ..................................................... H04L 63/18
USPC .......................... 380/255, 270; 713/150, 189
See application file for complete search history.

(56) References Cited

U.S. PATENT DOCUMENTS

| 5,319,711 | A  | * | 6/1994  | Servi ............................ 380/247 |
| 6,385,644 | B1 | * | 5/2002  | Devine ............... G06F 11/0709 |
|           |    |   |         | 707/E17.107 |
| 6,496,928 | B1 | * | 12/2002 | Deo et al. ...................... 713/153 |
| 6,948,062 | B1 | * | 9/2005  | Clapper ........................ 713/162 |
| 6,985,591 | B2 | * | 1/2006  | Graunke ....................... 380/277 |
| 7,243,242 | B2 | * | 7/2007  | Moriai .......................... 713/300 |
| 2001/0034714 | A1 | * | 10/2001 | Terao et al. .................... 705/57 |
| 2002/0032853 | A1 | * | 3/2002  | Preston ................. H04L 63/061 |
|           |    |   |         | 713/151 |

(Continued)

OTHER PUBLICATIONS

Basagni et al.; Secure pebblenets; Published in: Proceeding MobiHoc '01 Proceedings of the 2nd ACM international symposium on Mobile ad hoc networking & computing; 2001; pp. 156-163; ACM Digital Library.*

(Continued)

*Primary Examiner* — Bradley Holder
(74) *Attorney, Agent, or Firm* — Steven M. Greenberg, Esq.; CRGO Law

(57) ABSTRACT

A secure messaging system and method includes receiving an encrypted message, the message having been encrypted using a token of a corresponding pervasive device; wirelessly verifying the presence of the pervasive device; and, if the presence can be verified, decrypting the message using the token. The verification step can include the steps of establishing a wireless link with the pervasive device; and, querying the pervasive device over the wireless link. The establishing step can include the step of establishing a Bluetooth link with the pervasive device. Furthermore, the querying step can include the step of requesting geographic coordinates which locate the pervasive device.

8 Claims, 2 Drawing Sheets

(56) References Cited

U.S. PATENT DOCUMENTS

| | | | |
|---|---|---|---|
| 2002/0080967 A1* | 6/2002 | Abdo | G06F 21/85 380/270 |
| 2002/0156896 A1* | 10/2002 | Lin | H04L 12/5895 709/227 |
| 2002/0159596 A1* | 10/2002 | Durand et al. | 380/255 |
| 2002/0166047 A1* | 11/2002 | Kawamoto | 713/169 |
| 2003/0005300 A1* | 1/2003 | Noble | G06F 21/35 713/172 |
| 2003/0037033 A1* | 2/2003 | Nyman | H04L 29/12264 |
| 2003/0093667 A1* | 5/2003 | Dutta et al. | 713/161 |

OTHER PUBLICATIONS

Kim et al.; Advanced transaction scheduling protocol for multilevel secure database in wireless mobile network environment; Published in: ATM (ICATM 2001) and High Speed Intelligent Internet Symposium, 2001. Joint 4th IEEE International Conference on; Date of Conference: Apr. 22-25, 2001; IEEE Xplore.*

* cited by examiner

ENHANCED MESSAGE SECURITY

CROSS-REFERENCE TO RELATED APPLICATIONS

This application is a Divisional of U.S. application Ser. No. 10/134,184, filed Apr. 29, 2002, entitled "ENHANCED MESSAGE SECURITY," which is incorporated herein by reference in its entirety.

BACKGROUND OF THE INVENTION

Field of the Invention

The present invention relates to message security and more particularly to securing electronic messages through wireless device based authentication.

Description of the Related Art

Electronic messaging, and in particular, the use of electronic mail (e-mail) and instant messengers (IM), continues to grow at an astounding rate. In consequence, it appears that electronic messaging, including e-mail and IM, has become a critical mode of interpersonal communications rivaled only by wireless communications. Nevertheless, every transmitted message can result in an unintentional breach of security. In particular, when a party other than the intended recipient of the message accesses the message, the intent of a secure transaction will have been lost.

Technologies have been implemented in recent years to remediate some of the actual and perceived risks associated with electronic messaging. In particular, asymmetrical encryption algorithms have been applied to ensure not only that only a key-bearing recipient can access encrypted content, but also that only the intended recipient who bears the key can access the encrypted content. Still, as has become well-known in the field of short and long-range wireless communications, wireless transmissions are inherently susceptible to unauthorized capturing by third party receivers.

In particular, line-of-sight communications protocols have always been susceptible both to intentional and inadvertent breaches of communications security. Similarly, both proposed and maturing short-range wireless technologies such as Bluetooth, Wi-Fi and other IEEE 802.11 variants, are vulnerable to the capturing of sensitive data by unauthorized users. Wi-Fi technologies in particular have become a cause for concern in the corporate environment and, in consequence, a feverish pace of urgent development has produced several technological stop-gap measures which directly address security in Wi-Fi networks. Still, no one stop-gap measure has proven to be an effective measure for secured messaging.

Notwithstanding the security risks of wireless messaging, the proliferation of wireless, pervasive devices as a means for interpersonal communications is unprecedented. Many advantages associated with the use of wireless, pervasive devices in computing applications remain wholly absent from conventional computing. For instance, whereas fixed location computing ordinarily associated with the conventional computing in itself provides no added dimension, wireless, pervasive computing adds a personal dimension to computing.

Specifically, wireless, pervasive computing devices like cellular telephones and personal digital assistants are seldom associated with a fixed location. Rather, wireless, pervasive computing devices, more often than not, are closely associated with the locale of the user. Still, few emerging technologies appreciate the personal dimension of wireless, pervasive computing. More importantly, no emerging technologies capitalize upon the personal dimension of wireless, pervasive computing in the context of secure messaging.

BRIEF SUMMARY OF THE INVENTION

The present invention is a secured messaging system and method. A secure messaging system can include a message source and a message recipient, communicatively linked to one another through a computer communications network. The system also can include a pervasive computing device personally associated with the message recipient and at least one token which uniquely identifies the pervasive computing device. The system further can include a first wireless communications receiver/transmitter disposed in the message recipient, and a second wireless communications receiver/transmitter disposed in the pervasive computing device.

Notably, the system can include both an encryption engine associated with the message source, and a decryption engine associated with the message recipient. In particular, the encryption engine can be configured to encrypt messages intended for the message recipient with the token. By comparison, the decryption engine can be configured to decrypt the messages with the token only when a wireless link has been is established between the first and second wireless receiver/transmitters.

In one aspect of the invention, the first and second wireless receiver/transmitters can be short range radio frequency receiver/transmitters. For example, the short range radio frequency receiver/transmitters can comport with the Bluetooth wireless protocol. Also, the token can include a media access control (MAC) address which corresponds to the pervasive computing device. In one alternative aspect of the invention, a geographic positioning system can be disposed in the pervasive computing device. In that alternative aspect, the token can include a set of geographic coordinates specifying a geographic position for the pervasive device.

A secure messaging method can include the steps of receiving an encrypted message, the message having been encrypted using a token of a corresponding pervasive device; wirelessly verifying the presence of the pervasive device; and, if the presence can be verified, decrypting the message using the token. The verification step can include the steps of establishing a wireless link with the pervasive device; and, querying the pervasive device over the wireless link. In particular, the establishing step can include the step of establishing a Bluetooth link with the pervasive device.

In one aspect of the inventive method, the querying step can include the step of sending a request to the pervasive device. Specifically, the request can include one of a request for the token, a request for an decryption key based upon the token, and a request for an acknowledgment of the request. In another aspect of the inventive method, the querying step can include the step of requesting geographic coordinates which locate the pervasive device.

BRIEF DESCRIPTION OF THE SEVERAL VIEWS OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

The present invention is a securing messaging system. In accordance with the present invention, messages can be secured using a token linked to a pervasive computing device personally associated with the intended recipient. The secured message can be forwarded through conventional data communications channels to the intended recipient. Upon receipt, the receiving computing device of the intended recipient can retrieve the token from the pervasive device in order to access the secured message. In particular, the receiving computing device can establish a wireless communicative link with the pervasive device through which link the token can be communicated to the recipient.

Figure 1A:
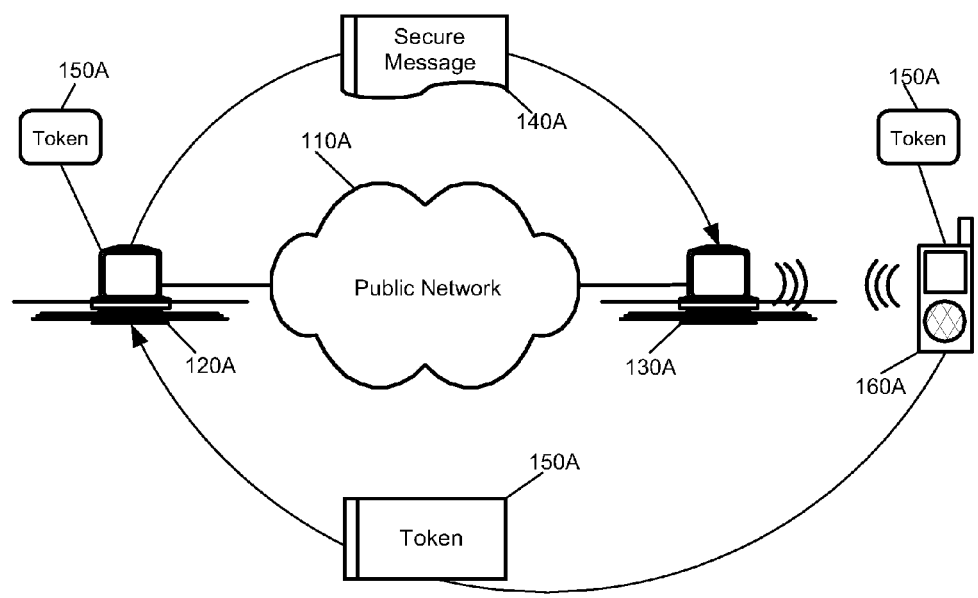
FIG. 1A is a schematic illustration of a secure messaging system in which messages are received and processed in a conventional computing device.

FIG. 1A is a schematic illustration of a secure messaging system in which messages are received and processed in a conventional computing device. The system can include two conventional computing devices 120A, 130A configured for data communications through a public network 110A, for example the Internet. The conventional computing devices 120A, 130A can include desktop type computers, server computers, portable laptop computers, mid-range computers, mainframe computers, though the invention is not limited strictly to those computing device types enumerated herein.

Importantly, the conventional computing device 130A can be further configured for short range wireless communications, including infrared communications and short range radio frequency communications. Examples of short range radio frequency communications include Wi-Fi.TM. (IEEE 802.11 (b)) and other 802.11 variants, as well as Bluetooth communications and other 802.15 variants, though the invention is not limited to any particular short range radio frequency communications technology. In any case, the conventional computing device 130A can establish and maintain a data communications link over the short range wireless communications channel with the pervasive computing device 160A.

The pervasive computing device 160A can be any such device having a personal dimension, including, for example, a data ready cellular telephone, a personal digital assistant (PDA), a pager, or an embedded system in a vehicle or article of clothing. Significantly, the pervasive computing device 160A can have associated therewith a token 150A. The token 150A can be any identifier suitable for definitively identifying the pervasive computing device 160A. One example of a suitable identifier can include a MAC address or other such hardware serial number. The token 150A can be forwarded to the conventional computing device 120A. Subsequently, when a message is to be sent over the public network 110A to the conventional computing device 130A, the message first can be uniquely secured using the token 150A.

In that regard, both symmetric and asymmetric encryption techniques are well-known in the art and, in consequence, the message can be secured with such techniques using the token 150A as an encryption key or as the seed for generating an encryption/decryption key pair. As a result, the secured message 140A can be forwarded to the conventional computing device 130A without fear of an authorized recipient accessing the secured message 140A. Once received, the conventional computing device 130A can establish a wireless link with the pervasive device 160A. Only when the wireless link has been effectively established between the pervasive computing device 160A and the conventional computing device 130A can a token 150A be exchanged between the two.

Once exchanged, the token 150A can be used to formulate the decryption key necessary to decrypt the secured message 140A. Alternatively, where the token 150A is the decryption key, no formulation will be required. In any event, in view of the personal dimension of the pervasive computing device 160A, the proximity of the pervasive computing device 160A to the conventional computing device 130A can be used to increase the probability that the recipient of the secured message is the intended recipient. Moreover, where only the token 150A and not the encryption key has been wireless communicated between the conventional computing device 130A and the pervasive computing device 160A, the insecurities associated with short range wireless communications can be circumvented.

Importantly, while in FIG. 1A, the conventional computing devices 120A, 130A are shown to be computers likely associated with a fixed location, the invention is not so limited. Rather, in other aspects of the present invention, the conventional computing devices 120A, 130A can include other pervasive computing devices such as a PDA, data enabled cellular telephone, paging device, or other such embedded system. In that regard, FIG. 1B is a schematic illustration of a secure messaging system in which messages forwarded by a conventional computing device are received and processed in a pervasive computing device.

Figure 1B:
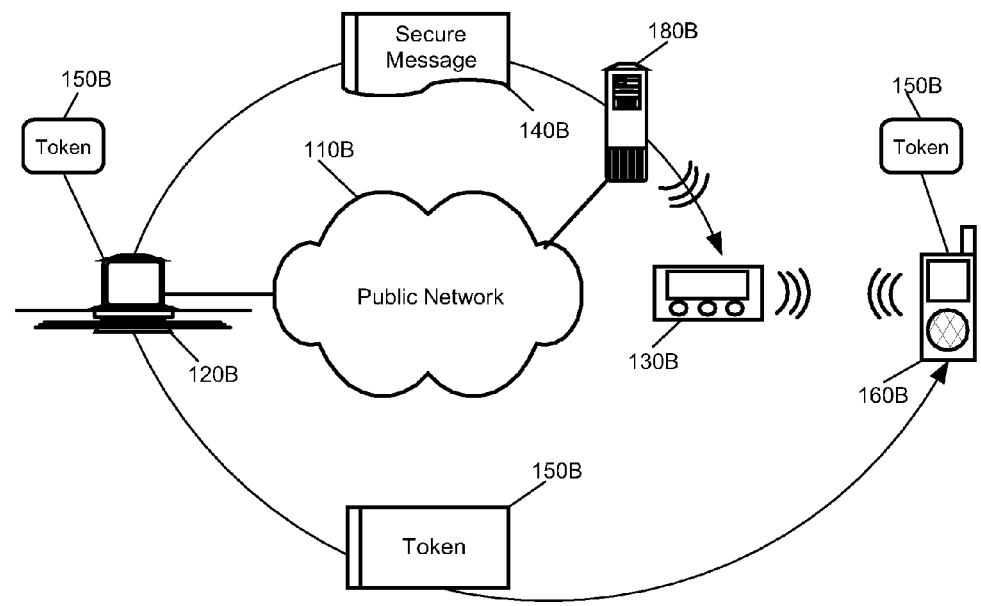
FIG. 1B is a schematic illustration of a secure messaging system in which messages are received and processed in a pervasive computing device; and, FIG. 2 is a block illustration of a process for securely communicating messages in the secure messaging system of the present invention.

The system of FIG. 1B can include a conventional computing device 120B and a first pervasive computing device 130B, both configured for data communications through a public network 110B, for example the Internet, via a wireless gateway 180B configured to support communications with the first pervasive computing device 130B. As in the case of FIG. 1A, in the system of FIG. 1B, the first pervasive computing device 130B can be further configured for short range wireless communications, including infrared communications and short range radio frequency communications. Using a short range wireless communications channel, the first pervasive computing device 130B can establish and maintain a data communications link with a second pervasive computing device 160B.

The second pervasive computing device 160B can have associated therewith a token 150B. As before, the token 150B can be any identifier suitable for definitively identifying the second pervasive computing device 160B, including, for example, a MAC address or other such hardware serial number. Prior to engaging in secure communications between the conventional computing device 120B and the first pervasive computing device 130B, the token 150B can be forwarded to the conventional computing device 120B. Subsequently, when a message is to be sent over the public network 110B to the first pervasive computing device 130B, the message first can be uniquely secured using the token 150B.

In particular, the message can be secured with such techniques using the token 150B as an encryption key or as the seed for generating an encryption key. As a result, the secured message 140B can be forwarded to the first pervasive computing device 130B without fear of an authorized recipient accessing the secured message 140B. Once received, the first pervasive computing device 130B can establish a wireless link with the second pervasive computing device 160B. Only when the wireless link has been effectively established between both pervasive computing devices 130B, 160B can a token 150B be exchanged between the two. Once exchanged, the token 150B can be used to formulate the decryption key necessary to decrypt the secured message 140B. Alternatively, where the token 150B is the decryption key, no formulation will be required.

In any event, in view of the personal dimension of the second pervasive computing device 160B, the proximity of the second pervasive computing device 160B to the first pervasive computing device 130B can be used to increase the probability that the recipient of the secured message is the intended recipient. Moreover, where only the token 150B and not the encryption key has been wireless communicated between the pervasive computing devices 130B, 160B, the insecurities associated with short range wireless communications can be circumvented.

Figure 2:
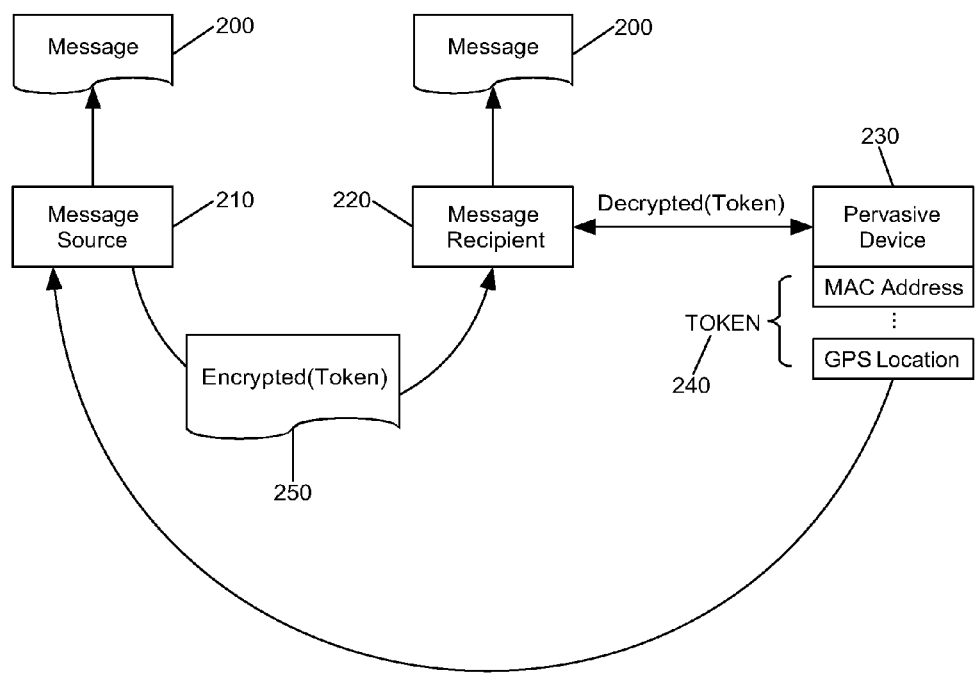

FIG. 2 is a block illustration of a process for securely communicating messages in the secure messaging system of the present invention. In accordance with the present invention, a message source 210 can securely exchange messages 200 in encrypted form 250 with a message recipient 220. In particular, the messages 200 can be placed in encrypted form 250 using an encryption key based upon a token 240. The token 240 can be any suitable identifier which uniquely identifies a pervasive computing device 230 personally associated with the message recipient 220. Though many such identifiers are contemplated, examples can include the MAC address of the pervasive computing device 230, or even the geographic position of the pervasive computing device 230. Notably, the token 240 can be acquired by the message source 210 both directly from the pervasive computing device 230, or indirectly through a peer-to-peer indexing scheme, or through a centralized registry.

Once in encrypted form 250, the message 200 can be forwarded to the recipient. Advantageously, the recipient's identity can be ensured by requiring the presence of the pervasive computing device 230 when decrypting the message 200 in its encrypted form 250. In particular, the presence of the pervasive computing device 230 can be confirmed using several techniques. In one preferred aspect of the invention, the decryption key which can be formulated based upon the token 240 can be forwarded to the pervasive computing device 230 by the message source 210. When the message recipient 220 attempts to access the message 200 in its encrypted form 250, the message client in the message recipient can query the pervasive computing device 230 for the decryption key.

Notwithstanding, other configurations are equally preferred. For instance, in an alternative preferred embodiment, the encryption key which had been formulated based upon the token 240 can be pre-stored in the pervasive computing device 230. In another alternative preferred embodiment, a notification can be forwarded to the pervasive computing device 230 in response to the receipt by the message recipient 220 of the encrypted form 250 of the message 200. The notification can request that the pervasive computing device 230 establish a communicative link with the message source 210 in order to retrieve the decryption key.

In yet another alternative embodiment, the encryption key can be forwarded with the encrypted form 250 of the message 200 to the message recipient 220. Upon receipt, the message recipient 220 can query the pervasive computing device 230 for the token. Moreover, as it is known that in some short range communications protocols, device identifiers can be transmitted as a matter of course in communications, in some short range communications protocols when combined with the present invention, merely a proceed or not to proceed query and query response can be exchanged between the message recipient 220 and the pervasive computing device 230.

Notably, aside from hardware identifiers, the token 240 can include the geographic position of the pervasive computing device 230. In that regard, the message 200 can be placed in encrypted form 250 according to a proposed geographic position of the pervasive computing device 230. Where the actual geographic position of the pervasive computing device 230 compares favorably to the proposed geographic position upon receipt of the message 200 in its encrypted form 250, the decryption key to,m required to access the message 200 can be computed based upon the geographic position of the pervasive computing device 230.

In view of the personal dimension of the pervasive computing device which, as described herein, typically will be required to access secure messages exchanged between a message source and message recipient, it will be recognized that communicative difficulties can arise where the pervasive computing device has been damaged, discarded, misplaced, lost or stolen by the message recipient. To circumvent such infrequent circumstances, in accordance with the present invention, the message recipient can establish an auxiliary communicative link with the message source in order to receive the decryption key upon establishing the identity of the message recipient to the satisfaction of the message source.

The present invention can be implemented as a computer performed process within hardware, software or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A secure messaging method comprising the steps of:
   receiving from over a public computer communications network, by a receiving computing device of an intended message recipient, an encrypted message from a computing device of a message source, said message having been encrypted using an encryption key based on a token uniquely identifying a pervasive device personally associated with the message recipient and separate from the receiving computing device; and, responding to the receipt of the encrypted message in the receiving computing device by establishing a short-range wireless link with the pervasive device, querying said pervasive device over said wireless link, obtaining by the receiving device from the pervasive device over the short-range wireless link a decryption key formulated based upon the token and decrypting said encrypted message received from the computing device of the message source, by the receiving computing device, using said obtained decryption key from the pervasive device from over the short range wireless link.

2. The secure messaging method of claim 1, wherein said establishing step comprises the step of establishing a Bluetooth link with said pervasive device.

3. The secure messaging method of claim 1, wherein said querying step comprises the step of sending a request to said pervasive device, said request comprising one of a request for said token, a request for an decryption key based upon said token, and a request for an acknowledgment of said request.

4. The secure messaging method of claim 1, wherein said querying step comprises the step of requesting geographic coordinates which locate said pervasive device.

5. A non-transitory computer-readable storage device having stored thereon a computer program for secured messaging, said computer program comprising a set of instructions which when executed by a processor causes a computer to perform the steps of:

receiving from over a public computer communications network, by a receiving computing device of an intended message recipient, an encrypted message from a computing device of a message source, said message having been encrypted using an encryption key based on a token uniquely identifying a pervasive device personally associated with the message recipient and separate from the receiving computing device; and, responding to the receipt of the encrypted message in the receiving computing device by establishing a short-range wireless link with the pervasive device, querying said pervasive device over said wireless link, obtaining by the receiving device from the pervasive device over the short-range wireless link a decryption key formulated based upon the token and decrypting said encrypted message received from the computing device of the message source, by the receiving computing device, using said obtained decryption key from the pervasive device from over the short range wireless link.

6. The computer-readable storage of claim 5, wherein said establishing step comprises the step of establishing a Bluetooth link with said pervasive device.

7. The computer-readable storage of claim 5, wherein said querying step comprises the step of sending a request to said pervasive device, said request comprising one of a request for said token, a request for an decryption key based upon said token, and a request for an acknowledgment of said request.

8. The computer-readable storage of claim 5, wherein said querying step comprises the step of requesting geographic coordinates which locate said pervasive device.

* * * * *